United States Patent [19]

Merritt et al.

[11] Patent Number: 5,441,821

[45] Date of Patent: Aug. 15, 1995

[54] ELECTROCHEMICAL FUEL CELL SYSTEM WITH A REGULATED VACUUM EJECTOR FOR RECIRCULATION OF THE FLUID FUEL STREAM

[75] Inventors: Robert D. Merritt, Vancouver; Brian N. Gorbell, North Vancouver, both of Canada

[73] Assignee: Ballard Power Systems Inc., North Vancouver, Canada

[21] Appl. No.: 363,706

[22] Filed: Dec. 23, 1994

[51] Int. Cl.$^6$ .............................................. H01M 8/04
[52] U.S. Cl. ........................................ 429/17; 429/25
[58] Field of Search ...................... 429/13, 17, 25, 34, 429/22

[56] References Cited

U.S. PATENT DOCUMENTS

| | | | |
|---|---|---|---|
| 3,180,763 | 4/1965 | Miller et al. | 429/25 |
| 3,462,308 | 8/1969 | Winters . | |
| 3,745,047 | 7/1973 | Fanciullo et al. . | |
| 4,098,959 | 7/1978 | Faniullo | 429/25 |
| 4,738,903 | 4/1988 | Garow et al. | 429/17 |
| 4,904,547 | 2/1990 | Mizumoto et al. | 429/34 X |
| 5,059,494 | 10/1991 | Vartanian et al. | 429/17 |
| 5,200,278 | 4/1993 | Watkins et al. . | |
| 5,366,821 | 11/1994 | Merritt et al. . | |

Primary Examiner—Anthony Skapars
Attorney, Agent, or Firm—McAndrews, Held & Malloy, Ltd.

[57] ABSTRACT

An electric power generation system has a regulated vacuum ejector for recirculating the fluid fuel stream. The system includes a fuel cell stack, a pressurized fuel supply having a pressure control valve for regulating the pressure of the fuel supply, a vacuum ejector interposed between the fuel supply and the stack fuel stream inlet, a pressure transducer interposed between the ejector discharge outlet and the stack fuel stream inlet, and a pressurized oxidant supply with a pressure transducer. The ejector suction inlet is fluidly connected to the fuel stream outlet of the fuel cell stack. The fuel stream pressure transducer transmits a signal to the pressure control valve to adjust the pressure of the fuel supply when the detected pressure of the fuel stream deviates from a predetermined value. The oxidant stream pressure transducer transmits a signal to the pressure control valve to adjust the pressure of the fuel supply when the detected pressure of the oxidant stream changes. The system is load-following to maintain uniform fuel stream pressure and recirculation ratio over a broad range of operating conditions. The system also maintains a balance between the pressure of the fuel stream and the pressure of the oxidant stream.

26 Claims, 1 Drawing Sheet

ELECTROCHEMICAL FUEL CELL SYSTEM WITH A REGULATED VACUUM EJECTOR FOR RECIRCULATION OF THE FLUID FUEL STREAM

FIELD OF THE INVENTION

The present invention relates to electrochemical fuel cells. More particularly, the present invention relates to an electric power generation system which includes a fuel cell stack and a regulated vacuum ejector for recirculating the fluid fuel stream. The system maintains a uniform fuel recirculation ratio and a balance between the pressure of the fuel stream and the pressure of oxidant stream.

BACKGROUND OF THE INVENTION

Electrochemical fuel cells convert fuel and oxidant to electricity and reaction product. Solid polymer electrochemical fuel cells generally employ a membrane electrode assembly ("MEA") which comprises an ion exchange membrane or solid polymer electrolyte disposed between two electrodes formed of porous, electrically conductive sheet material, typically carbon fiber paper. The MEA contains a layer of catalyst, typically in the form of finely comminuted platinum, at each membrane/electrode interface to induce the desired electrochemical reaction. The electrodes are electrically coupled to provide a path for conducting electrons between the electrodes to an external load.

At the anode, the fuel permeates the porous electrode material and reacts at the catalyst layer to form cations, which migrate through the membrane to the cathode. At the cathode, the oxygen-containing gas supply reacts at the catalyst layer to form anions. The anions formed at the cathode react with the cations to form a reaction product.

In electrochemical fuel cells employing hydrogen as the fuel and oxygen-containing air (or substantially pure oxygen) as the oxidant, the catalyzed reaction at the anode produces hydrogen cations (protons) from the fuel supply. The ion exchange membrane facilitates the migration of hydrogen ions from the anode to the cathode. In addition to conducting hydrogen ions, the membrane isolates the hydrogen-containing fuel stream from the oxygen-containing oxidant stream. At the cathode, oxygen reacts at the catalyst layer to form anions. The anions formed at the cathode react with the hydrogen ions that have crossed the membrane to form liquid water as the reaction product. The anode and cathode reactions in hydrogen/oxygen fuel cells are shown in the following equations:

Anode reaction: $H_2 \rightarrow 2H^+ + 2e^-$

Cathode reaction: $\frac{1}{2}O_2 + 2H^+ + 2e^- \rightarrow H_2O$

In typical fuel cells, the MEA is disposed between two electrically conductive plates, each of which has at least one flow passage engraved or milled therein. These fluid flow field plates are typically formed of graphite. The flow passages direct the fuel and oxidant to the respective electrodes, namely, the anode on the fuel side and the cathode on the oxidant side. In a single cell arrangement, fluid flow field plates are provided on each of the anode and cathode sides. The fluid flow field plates act as current collectors, provide support for the electrodes, provide access channels for the fuel and oxidant to the respective anode and cathode surfaces, and provide channels for the removal of water formed during operation of the cell.

Two or more fuel cells can be connected together, generally in series but sometimes in parallel, to increase the overall power output of the assembly. In series arrangements, one side of a given fluid flow field plate serves as an anode plate for one cell and the other side of the fluid flow field plate can serve as the cathode plate for the adjacent cell. Such a series connected multiple fuel cell arrangement is referred to as a fuel cell stack, and is usually held together in its assembled state by tie rods and end plates. The stack typically includes manifolds and inlet ports for directing the fluid fuel stream (substantially pure hydrogen, methanol reformate or natural gas reformate) and the fluid oxidant stream (substantially pure oxygen or oxygen-containing air) to the anode and cathode flow field channels. The stack also usually includes a manifold and inlet port for directing the coolant fluid stream, typically water, to interior channels within the stack to absorb heat generated by the exothermic reaction of hydrogen and oxygen within the fuel cells. The stack also generally includes exhaust manifolds and outlet ports for expelling the unreacted fuel and oxidant gases, each carrying entrained water, as well as an exhaust manifold and outlet port for the coolant water exiting the stack.

Solid polymer fuel cells generally employ perfluorosulfonic ion exchange membranes, such as those sold by DuPont under its NAFION trade designation and by Dow under the trade designation XUS 13204.10. When employing such membranes, the fuel and oxidant reactant streams are each generally humidified before they are introduced to solid polymer fuel cells so as to facilitate cation exchange and to avoid drying, and thus damaging, the ion exchange membranes separating the anode and cathode of each cell.

Each of the fuel cells making up the stack is typically flooded with the selected fuel and oxidant at a desired pressure. The pressure is generally controlled by a regulator at the source of the reactant. When an electrical load is placed on the circuit connecting the electrodes, the fuel and oxidant are consumed in direct proportion to the electrical current drawn by the load.

Each reactant stream exiting the fuel cell stack generally contains water. The outlet fuel stream from the anodes generally contains the water added to humidify the stream plus any product water drawn across the membrane from the cathode and absorbed as vapor in the fuel stream. The outlet oxidant stream from the cathodes generally contains the water added to humidify the stream plus product water formed at the cathode that is either entrained as water droplets or is absorbed as vapor in the oxidant stream. As the power output of the fuel cell stack is increased, more water accumulates at the anode and at the cathode, thereby increasing the recirculation flow rate required to remove water and keep the flow channels in the stack unobstructed.

Excess water extracted from one or both of the reactant streams exiting the fuel cell can be accumulated in a separator or knockout drum. The excess water so accumulated can then be recirculated and used as a source of coolant fluid or humidification water, or simply drained from the system.

When one of the reactants fed to the fuel cells is substantially pure hydrogen or oxygen, the unconsumed reactant exhausted from the fuel cells may be recirculated to minimize waste that would result from venting the reactant to the atmosphere. Excess water may be removed from the recirculated reactant stream before it is merged with the corresponding incoming fresh reactant stream upstream of the inlet to the fuel cell stack. Alternatively, the recirculated reactant stream containing water vapor may be merged directly with the incoming fresh reactant stream, thereby humidifying the incoming fresh reactant stream and avoiding the need for a separate humidifier.

Similarly, when one or both of the reactants is a dilute reactant, such as a reformate or air, the unconsumed reactant exhausted from the fuel cells may also be recirculated, particularly in the case of the fuel stream. However, the dilute reactant stream is more often discarded after it has passed once through the fuel cell stack, particularly when the dilute reactant is air. The excess water in the outlet dilute reactant stream is generally removed in a separator or knockout drum. The exhaust reactant stream is then generally vented to the atmosphere.

It is often advantageous to integrate the product water separated from the outlet reactant streams with the coolant stream, and thereby use the product water generated electrochemically in the fuel cell stack to regulate the temperature of the stack. In this regard, the use of product water as the coolant avoids the need to provide a separate external source of coolant fluid, since the water generated by the fuel cells is itself a suitable coolant fluid.

In characterizing systems employing recirculated reactant streams, it is convenient to define the term "recirculation ratio". As used herein, "recirculation ratio" is the amount of a reactant supplied to the fuel cell stack divided by the amount of the reactant consumed in one pass through the fuel cell stack. In typical hydrogen/oxygen fuel cell stacks, the hydrogen recirculation ratio ranges from 1.2 to 5.0, and more preferably from 1.5 to 2.0.

In fuel cell based electric power generation systems in which one or more of the reactant streams is recirculated, vacuum ejectors have been employed to effect recirculation. Winters U.S. Pat. No. 3,462,308 discloses a fuel cell system in which each of the fuel and oxidant streams discharged from the fuel cell is recirculated and merged with the respective incoming, fresh fuel and oxidant streams by means of ejectors 23 and 23'. Each ejector is described as including a venturi throat. However, Winter's ejector configuration is designed for fixed-point operation in that a constant reactant stream pressure drop is required across each of the ejectors. In order to maintain the necessary pressure drop across the ejectors to effect recirculation, Winter's system discharges the recirculated reactant streams as required via vent valves 21 and 21'. Thus, Winter's reactant recirculation system has a load-following capability, but incurs a serious efficiency penalty due to the venting of the recirculated reactant streams to the atmosphere.

Vacuum ejectors have also been incorporated into the fuel processing subsystem of a reformate-based fuel cell electric power generation system. In Fanciullo et al. U.S. Pat. No. 3,745,047, an ejector is employed to draw steam into a fuel stream prior to its introduction into a reformer. In the Fanciullo system, however, an ejector is not employed to recirculate the fuel stream (or the oxidant stream), since the outlet fuel stream is not recirculated to the fuel cell but is instead directed through conduit 34 to the reformer burner.

The primary purpose of an ejector is to transport a gas, liquid, powder or solid particles from one pressure level to a relatively higher pressure level. Ejectors generally contain no moving parts and are therefore considered to be passive devices. In an ejector, pressurized motive fluid passes through a nozzle, where its pressure is dissipated in accelerating the fluid to a high velocity as it exits the mouth of the nozzle. The high velocity fluid stream exiting the nozzle entrains relatively low pressure fluid introduced at a suction inlet to the ejector. Entrainment of the low pressure suction fluid with the motive fluid causes the suction fluid to move with the motive fluid. The two streams mix as they pass into a diffuser portion of the ejector. The velocity profile of the stream changes along the fluid path of the ejector, and the pressure of the stream rises as the fluid reaches the ejector outlet. As the motive fluid flow rate increases, the motive pressure must also be increased to maintain constant discharge pressure due to the increased pressure drop across the ejector nozzle. As the motive/discharge pressure increases, the suction fluid flow rate also increases.

SUMMARY OF THE INVENTION

In one embodiment, the present invention includes an electric power generation system which comprises:
(a) a fuel cell stack comprising a fuel stream inlet, a fuel stream outlet, an oxidant stream inlet, and at least one fuel cell for promoting an electrocatalytic reaction of a fuel stream introduced at the fuel stream inlet with an oxidant stream introduced at the oxidant stream inlet to produce electricity, reaction product, and heat;
(b) a pressurized fuel supply having a pressure control valve for regulating the pressure of the fuel supply;
(c) a vacuum ejector interposed between the fuel supply and the fuel stream inlet, the ejector comprising a motive inlet, a suction inlet, and a discharge outlet, the motive inlet fluidly connected to the fuel supply, the suction inlet fluidly connected to the fuel stream outlet, and the discharge outlet fluidly connected to the fuel stream inlet;
(d) a pressure transducer interposed in the fuel stream between the discharge outlet and the suction inlet, the pressure transducer detecting the pressure of the fuel stream and transmitting a corresponding signal to the pressure control valve; and
(e) a pressurized oxidant supply fluidly connected to the oxidant stream inlet.

In operation, the pressure transducer transmits a signal to the pressure control valve to increase the pressure of the fuel supply when the detected pressure of the fuel stream falls below a predetermined value, as would occur when the load, and consequently the fuel stream flow rate through the ejector, increases. Conversely, the pressure transducer transmits a signal to the pressure control valve to decrease the pressure of the fuel supply when the detected pressure of the fuel stream exceeds a predetermined value, as would occur when the load, and consequently the fuel stream flow rate through the ejector, decreases.

In the preferred electric power generation system, the fuel cell stack further comprises an oxidant stream outlet. The pressure transducer is preferably interposed in the fuel stream between said discharge outlet and the fuel stream inlet.

The signal transmitted by the pressure transducer can be electronic or mechanical, such that an electrical, hydraulic, or pneumatic signal, which corresponds to the detected pressure of the fuel stream, is transmitted to the pressure control valve.

In the preferred system, the pressurized fuel supply comprises substantially pure hydrogen. The pressurized oxidant supply preferably comprises oxygen. The preferred oxidant supply is oxygen-containing air. Where the fuel is hydrogen and the oxidant is oxygen, the reaction product is water.

In the preferred system, each of the fuel cell comprises an ion exchange membrane and the system further comprises a fuel stream humidifier for imparting water vapor to the fuel stream and an oxidant stream humidifier for imparting water vapor to the oxidant stream. A water separator is preferably interposed between the fuel stream outlet and the suction inlet such that at least a portion of the water contained in the fuel stream is removed.

In the most preferred system, the oxidant supply has a pressure transducer for detecting the pressure of the oxidant stream and transmitting a corresponding signal to the pressure control valve, such that the oxidant stream pressure transducer transmits a signal to the pressure control valve to increase the pressure of the fuel supply when the detected pressure of the oxidant stream increases and such that the oxidant stream pressure transducer transmits a signal to the pressure control valve to decrease the pressure of the fuel supply when the detected pressure of the oxidant stream decreases.

In another embodiment, the present invention includes an electric power generation system which comprises:

(a) a fuel cell stack comprising a fuel stream inlet, an oxidant stream inlet, an oxidant stream outlet, and at least one fuel cell for promoting an electrocatalytic reaction of a fuel stream introduced at the fuel stream inlet with an oxidant stream introduced at the oxidant stream inlet to produce electricity, reaction product, and heat;

(b) a pressurized oxidant supply having a pressure control valve for regulating the pressure of the oxidant supply;

(c) a vacuum ejector interposed between the oxidant supply and the oxidant stream inlet, the ejector comprising a motive inlet, a suction inlet, and a discharge outlet, the motive inlet fluidly connected to the oxidant supply, the suction inlet fluidly connected to the oxidant stream outlet, and the discharge outlet fluidly connected to the oxidant stream inlet;

(d) a pressure transducer interposed in the oxidant stream between the discharge outlet and the suction inlet, the pressure transducer detecting the pressure of the oxidant stream and transmitting a corresponding signal to the pressure control valve; and (e) a pressurized fuel supply fluidly connected to the fuel stream inlet.

In operation, the pressure transducer transmits a signal to the pressure control valve to increase the pressure of the oxidant supply when the detected pressure of the oxidant stream falls below a predetermined value. Conversely, the pressure transducer transmits a signal to the pressure control valve to decrease the pressure of the oxidant supply when the detected pressure of the oxidant stream exceeds a predetermined value.

In the preferred electric power generation system, the fuel cell stack further comprises a fuel stream outlet. The pressure transducer is preferably interposed in the oxidant stream between the discharge outlet and the oxidant stream inlet. The pressurized oxidant supply preferably comprises substantially pure oxygen.

In the most preferred system, the fuel supply has a pressure transducer for detecting the pressure of the fuel stream and transmitting a corresponding signal to the pressure control valve, such that the fuel stream pressure transducer transmits a signal to the pressure control valve to increase the pressure of the oxidant supply when the detected pressure of the fuel stream increases and such that the fuel stream pressure transducer transmits a signal to the pressure control valve to decrease the pressure of the oxidant supply when the detected pressure of the fuel stream decreases.

In another embodiment, the present invention includes a method for recirculating a first reactant stream in an electric power generation system comprising a fuel cell stack, a pressurized first reactant supply having a pressure control valve for regulating the pressure of the first reactant supply, and a pressurized second reactant supply. The method comprises the steps of:

(a) interposing a vacuum ejector between the first reactant supply and the first reactant stream inlet of the stack, the ejector comprising a motive inlet, a suction inlet, and a discharge outlet;

(b) fluidly connecting the motive inlet to the first reactant supply;

(c) fluidly connecting the suction inlet to the first reactant stream outlet of the stack;

(d) fluidly connecting the discharge outlet to the first reactant stream inlet;

(e) interposing a pressure transducer between the discharge outlet and the first reactant stream inlet, the pressure transducer capable of detecting the pressure of the first reactant stream and transmitting a corresponding signal to the pressure control valve;

(f) transmitting a signal from the pressure transducer to the pressure control valve to increase the pressure of the first reactant supply when the detected pressure of the first reactant stream falls below a predetermined value; and (g) transmitting a signal from the pressure transducer to the pressure control valve to decrease the pressure of the first reactant supply when the detected pressure of the first reactant stream exceeds a predetermined value.

In the preferred method, the first reactant stream comprises hydrogen and the second reactant stream comprises oxygen.

The most preferred method further comprises the steps of:

(h) interposing a pressure transducer between the second reactant supply and the second reactant stream inlet of the stack, the second reactant pressure transducer capable of detecting the pressure of the second reactant stream and transmitting a corresponding signal to the pressure control valve;

(i) transmitting a signal from the pressure transducer to the pressure control valve to increase the pressure of the first reactant supply when the detected pressure of the second reactant stream increases; and (j) transmitting a signal to the pressure control valve to decrease the pressure of the first reactant supply when the detected pressure of the second reactant stream decreases.

DETAILED DESCRIPTION OF THE PREFERRED EMBODIMENTS

Figure 1:
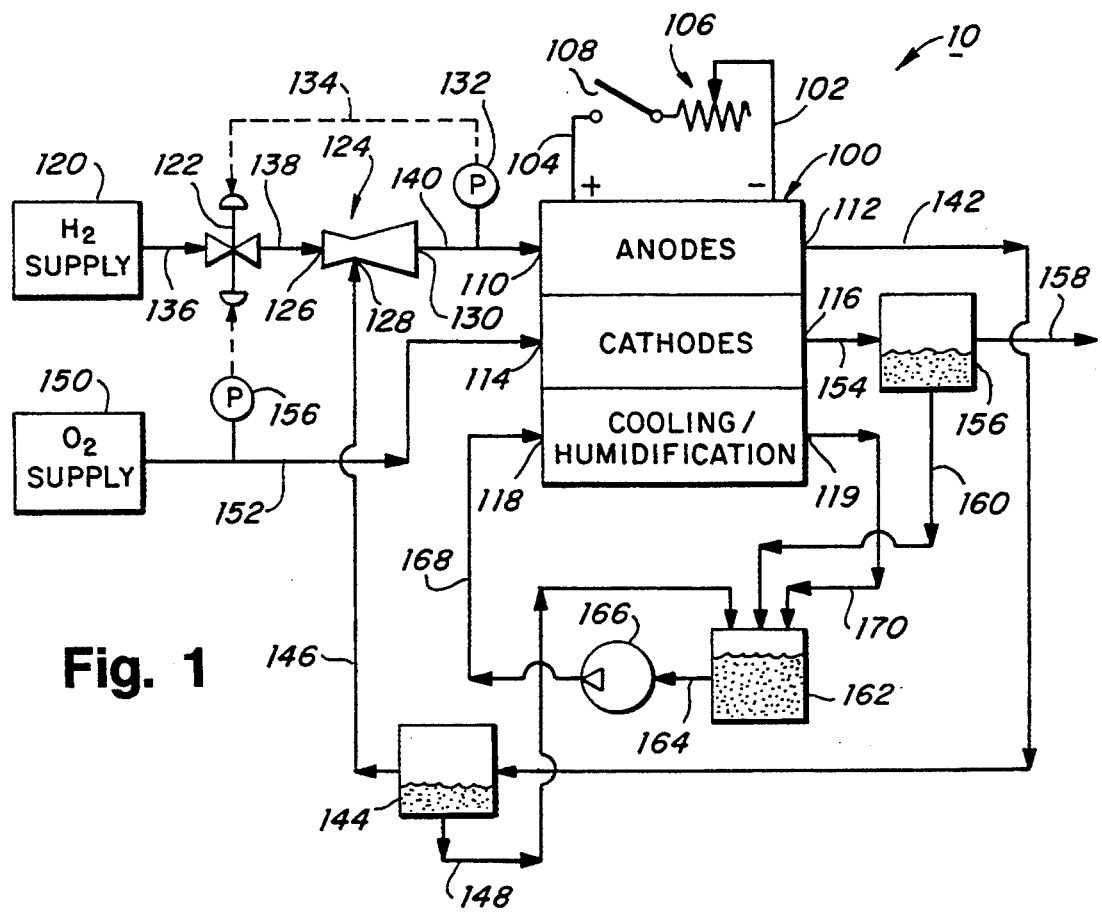
FIG. 1 is a schematic diagram of one embodiment of a fuel cell based electric power generation system with a regulated vacuum ejector for recirculation of the fluid fuel stream.

Turning first to FIG. 1, a fuel cell based electric power generation system 10 includes a fuel cell stack 100, preferably comprising a plurality of fuel cells. The fuel cell stack 100 is more completely described in Watkins et al. U.S. Pat. No. 5,200,278 (in FIGS. 1–6 and the accompanying text), which is incorporated herein by reference in its entirety. A preferred reactant supply and control system for fuel cells of the type which make up stack 100 is described in Merritt et al. U.S. Pat. No. 5,366,821, which is also incorporated herein by reference in its entirety.

Each of the fuel cells of stack 100 has an anode, a cathode, an electrolyte (preferably a solid polymer ion exchange membrane), and cooling/humidification units, as will be explained in more detail below. As illustrated schematically in FIG. 1, fuel cell stack 100 includes a fuel stream inlet 110, a fuel stream outlet 112, an oxidant stream inlet 114, an oxidant stream outlet 116, a coolant-/humidification fluid inlet 118, and a coolant/humidification fluid outlet 119.

Fuel cell stack 100 includes negative and positive bus plates 102, 104, respectively, to which a circuit comprising a variable load 106 and a contactor switch 108 are electrically connected. In addition to stack 100, system 10 also includes a fuel circuit, an oxidant circuit, and a cooling/humidification circuit.

The fuel circuit of system 10 in FIG. 1 includes a pressurized substantially pure hydrogen supply 120 having fuel feed line 136. Pressure control valve 122 capable of receiving and responding to signals, as shown and as explained in more detail below, regulates the pressure of the fuel stream from feed line 136. A vacuum ejector 124 is interposed between fuel supply 120 and fuel stream inlet 110 of stack 100. Ejector 124 includes a motive inlet 126, a suction inlet 128, and a discharge outlet 130. Motive inlet 126 is fluidly connected to the outlet of pressure control valve 122 and receives pressurized fuel stream 136, as shown. Suction inlet 128 is fluidly connected to the fuel stream outlet 112 of stack 100, so as to recirculate the outlet fuel stream 142. A water separator or knockout drum 144 is interposed between the fuel stream outlet 112 of stack 100 and the suction inlet 128 of ejector 124. Water separator 144 removes at least a portion of the water contained in outlet fuel stream 142 before directing the stream 146 to the suction inlet 128 of ejector 124. Inlet fuel stream 140 is thus formed by the merger of recirculated fuel stream 146 and fresh pressurized fuel stream 138.

Discharge outlet 130 of ejector 124 is fluidly connected to the fuel stream inlet 110 of stack 100. A pressure transducer 132 is interposed between discharge outlet 130 and fuel stream inlet 110. Pressure transducer 132 detects the pressure of inlet fuel stream 140 and is capable of transmitting a signal corresponding to the detected pressure in inlet fuel stream 140. The signal from pressure transducer 132 to pressure control valve 122, shown by a broken line in FIG. 1, can be electronic or mechanical. In this regard, an electrical, hydraulic or pneumatic signal, which corresponds to the detected pressure of the inlet fuel stream, is transmitted from pressure transducer 132 to the pressure control valve 122. In operation, pressure transducer 132 transmits a signal to pressure control valve 122 so as to increase the pressure of fuel stream 138 when the detected pressure of inlet fuel stream 140 falls below a predetermined value, typically a value between 20–50 psi gauge, nominally 30 psi gauge. The detected pressure of inlet fuel stream 140 would fall below that predetermined value when the load, and consequently the fuel stream flow rate through the ejector, increases. Conversely, pressure transducer 132 transmits a signal to pressure control valve 122 so as to decrease the pressure of fuel stream 138 when the detected pressure of inlet fuel stream 140 exceeds a predetermined value. The detected pressure of inlet fuel stream 140 would exceed that predetermined value when the load, and consequently the fuel stream flow rate through the ejector, decreases. The interaction of pressure transducer 132 and pressure control valve 122 causes ejector 124 to be load-following and therefore capable of maintaining a relatively uniform inlet fuel stream pressure to the fuel cell stack over a range of potential operating conditions, as well as maintaining a relatively uniform outlet fuel stream recirculation ratio.

The oxidant circuit of system 10 in FIG. 1 includes a pressurized oxygen-containing air supply 150 as the source for inlet oxidant stream 152. Pressure transducer 156 is interposed between oxidant supply 150 and oxidant stream inlet 114. Pressure transducer 156 detects the pressure of inlet oxidant stream 152 and is capable of transmitting a signal corresponding to the detected pressure in inlet oxidant stream 152. The signal from pressure transducer 156 to pressure control valve 122, shown by a broken line in FIG. 1, can be electronic or mechanical. In this regard, an electrical, hydraulic or pneumatic signal, which corresponds to the detected pressure of the inlet fuel stream, is transmitted from pressure transducer 156 to the pressure control valve 122. In operation, pressure transducer 156 transmits a signal to pressure control valve 122 so as to increase the pressure of fuel stream 138 when the detected pressure of inlet oxidant stream 152 increases. Conversely, pressure transducer 156 transmits a signal to pressure control valve 122 to decrease the pressure of fuel stream 138 when the detected pressure of inlet oxidant stream 152 decreases. Thus, pressure transducer 156 acts as a bias on pressure control valve 122 to maintain a balance between the pressure of inlet fuel stream 140 and the pressure of inlet oxidant stream 152.

Outlet oxidant stream 154 is discharged from stack 100 via oxidant stream outlet 116. A water separator or knockout drum 156 removes at least a portion of the water contained in outlet oxidant stream 154. As shown in FIG. 1, outlet oxidant stream 158 from water separator 156 is expelled from system 10 to the atmosphere.

The cooling/humidification circuit of system in FIG. 1 includes a reservoir 162. Reservoir 162 can receive from water separators 144, 156 the water removed from the outlet fuel and oxidant streams. The coolant-/humidification fluid stream 164 from reservoir 162 is directed by a pump 166 as a pressurized stream 168 to a coolant/humidification fluid inlet 118 of stack 100. The outlet coolant/humidification fluid stream 170 is discharged from the stack 100 via a coolant/humidification fluid outlet 119. The outlet coolant/humidification fluid stream 170 is then returned to reservoir 162, as shown in FIG. 1.

Figure 2:
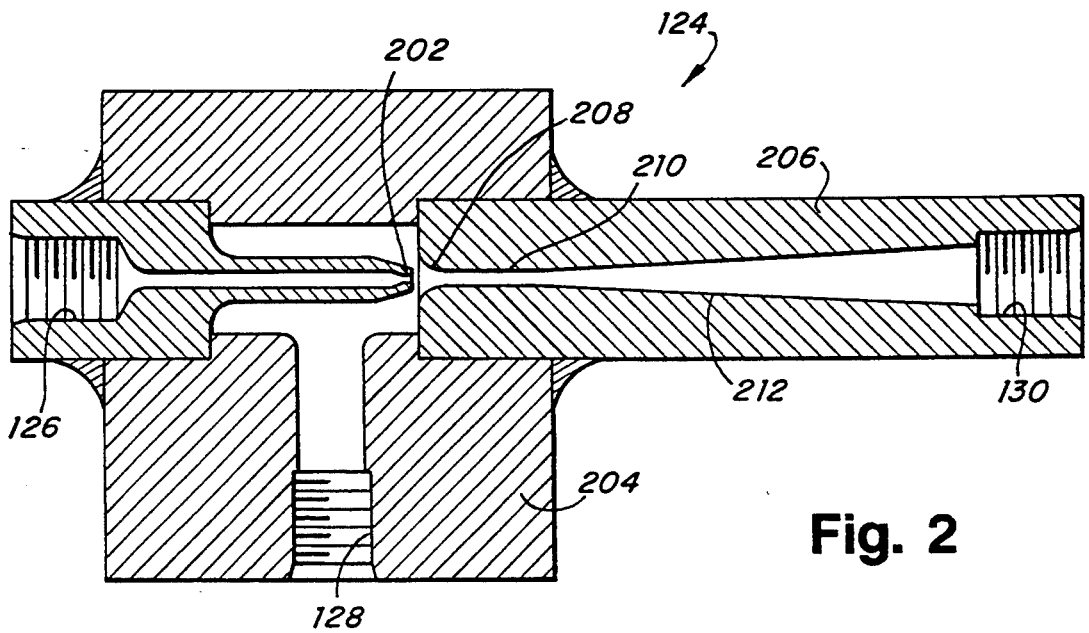
FIG. 2 is a side sectional view of the vacuum ejector illustrated schematically in FIG. 1.

FIG. 2 is a side sectional view of the vacuum ejector 124 illustrated schematically in FIG. 1. Vacuum ejector 124 includes a motive inlet 126, a suction inlet 128, and a discharge outlet 130. Ejector 124 also includes a motive nozzle 202, a motive chest 204, a diffuser portion 206, an inlet diffuser 208, a diffuser throat 210, and an outlet diffuser 212.

A vacuum ejector could also be incorporated into a fuel cell based electric power generation system employing substantially pure oxygen as the oxidant stream to recirculate the fluid oxidant stream. In this regard, essentially the same principles set forth above with respect to vacuum ejector recirculation of the fluid fuel stream would apply to vacuum ejector recirculation of the fluid oxidant stream.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. An electric power generation system comprising:
 (a) a fuel cell stack comprising a fuel stream inlet, a fuel stream outlet, an oxidant stream inlet, and at least one fuel cell for promoting an electrocatalytic reaction of a fuel stream introduced at said fuel stream inlet with an oxidant stream introduced at said oxidant stream inlet to produce electricity, reaction product, and heat;
 (b) a pressurized fuel supply having a pressure control valve for regulating the pressure of said fuel supply;
 (c) a vacuum ejector interposed between said fuel supply and said fuel stream inlet, said ejector comprising a motive inlet, a suction inlet, and a discharge outlet, said motive inlet fluidly connected to said fuel supply, said suction inlet fluidly connected to said fuel stream outlet, and said discharge outlet fluidly connected to said fuel stream inlet;
 (d) a pressure transducer interposed in said fuel stream between said discharge outlet and said suction inlet, said pressure transducer detecting the pressure of said fuel stream and transmitting a corresponding signal to said pressure control valve; and
 (e) a pressurized oxidant supply fluidly connected to said oxidant stream inlet;
whereby said pressure transducer transmits a signal to said pressure control valve to increase the pressure of said fuel supply when the detected pressure of said fuel stream falls below a predetermined value and said pressure transducer transmits a signal to said pressure control valve to decrease the pressure of said fuel supply when the detected pressure of said fuel stream exceeds a predetermined value.

2. The electric power generation system of claim 1 wherein said fuel cell stack further comprises an oxidant stream outlet.

3. The electric power generation system of claim 1 wherein said pressure transducer is interposed in said fuel stream between said discharge outlet and said fuel stream inlet.

4. The electric power generation system of claim 1 wherein said pressure transducer transmits an electronic signal to said pressure control valve which corresponds to the detected pressure of said fuel stream.

5. The electric power generation system of claim 1 wherein said pressure transducer transmits a hydraulic signal to said pressure control valve which corresponds to the detected pressure of said fuel stream.

6. The electric power generation system of claim 1 wherein said pressure transducer transmits a pneumatic signal to said pressure control valve which corresponds to the detected pressure of said fuel stream.

7. The electric power generation system of claim 1 wherein said pressurized fuel supply comprises substantially pure hydrogen.

8. The electric power generation system of claim 7 wherein said pressurized oxidant supply comprises oxygen and said reaction product is water.

9. The electric power generation system of claim 8 wherein said oxidant supply is oxygen-containing air.

10. The electric power generation system of claim 1 wherein said at least one fuel cell comprises an ion exchange membrane and the system further comprises a fuel stream humidifier for imparting water vapor to said fuel stream and an oxidant stream humidifier for imparting water vapor to said oxidant stream.

11. The electric power generation system of claim 10 wherein a water separator is interposed between said fuel stream outlet and said suction inlet whereby at least a portion of the water contained in said fuel stream is removed.

12. The electric power generation system of claim 1 wherein said oxidant supply has a pressure transducer for detecting the pressure of said oxidant stream and transmitting a corresponding signal to said pressure control valve, whereby said oxidant stream pressure transducer transmits a signal to said pressure control valve to increase the pressure of said fuel supply when the detected pressure of said oxidant stream increases and said oxidant stream pressure transducer transmits a signal to said pressure control valve to decrease the pressure of said fuel supply when the detected pressure of said oxidant stream decreases.

13. An electric power generation system comprising:
 (a) a fuel cell stack comprising a fuel stream inlet, an oxidant stream inlet, an oxidant stream outlet, and at least one fuel cell for promoting an electrocatalytic reaction of a fuel stream introduced at said fuel stream inlet with an oxidant stream introduced at said oxidant stream inlet to produce electricity, reaction product, and heat;
 (b) a pressurized oxidant supply having a pressure control valve for regulating the pressure of said oxidant supply;
 (c) a vacuum ejector interposed between said oxidant supply and said oxidant stream inlet, said ejector comprising a motive inlet, a suction inlet, and a discharge outlet, said motive inlet fluidly connected to said oxidant supply, said suction inlet fluidly connected to said oxidant stream outlet, and said discharge outlet fluidly connected to said oxidant stream inlet;
 (d) a pressure transducer interposed in said oxidant stream between said discharge outlet and said suction inlet, said pressure transducer detecting the pressure of said oxidant stream and transmitting a corresponding signal to said pressure control valve; and (e) a pressurized fuel supply fluidly connected to said fuel stream inlet;

whereby said pressure transducer transmits a signal to said pressure control valve to increase the pressure of said oxidant supply when the detected pressure of said oxidant stream falls below a predetermined value and said pressure transducer transmits a signal to said pressure control valve to decrease the pressure of said oxidant supply when the detected pressure of said oxidant stream exceeds a predetermined value.

14. The electric power generation system of claim 13 wherein said fuel cell stack further comprises a fuel stream outlet.

15. The electric power generation system of claim 13 wherein said pressure transducer is interposed in said oxidant stream between said discharge outlet and said oxidant stream inlet.

16. The electric power generation system of claim 13 wherein said pressure transducer transmits an electronic signal to said pressure control valve which corresponds to the detected pressure of said oxidant stream.

17. The electric power generation system of claim 13 wherein said pressure transducer transmits a hydraulic signal to said pressure control valve which corresponds to the detected pressure of said oxidant stream.

18. The electric power generation system of claim 13 wherein said pressure transducer transmits a pneumatic signal to said pressure control valve which corresponds to the detected pressure of said oxidant stream.

19. The electric power generation system of claim 13 wherein said pressurized oxidant supply comprises substantially pure oxygen.

20. The electric power generation system of claim 19 wherein said pressurized fuel supply comprises hydrogen and said reaction product is water.

21. The electric power generation system of claim 13 wherein said at least one fuel cell comprises an ion exchange membrane and the system further comprises a fuel stream humidifier for imparting water vapor to said fuel stream and an oxidant stream humidifier for imparting water vapor to said oxidant stream.

22. The electric power generation system of claim 21 wherein a water separator is interposed between said oxidant stream outlet and said suction inlet whereby at least a portion of the water contained in said oxidant stream is removed.

23. The electric power generation system of claim 13 wherein said fuel supply has a pressure transducer for detecting the pressure of said fuel stream and transmitting a corresponding signal to said pressure control valve, whereby said fuel stream pressure transducer transmits a signal to said pressure control valve to increase the pressure of said oxidant supply when the detected pressure of said fuel stream increases and said fuel stream pressure transducer transmits a signal to said pressure control valve to decrease the pressure of said oxidant supply when the detected pressure of said fuel stream decreases.

24. A method for recirculating a first reactant stream in an electric power generation system comprising a fuel cell stack comprising a first reactant stream inlet, a first reactant stream outlet, an second reactant stream inlet, and at least one fuel cell for promoting the electrocatalytic reaction of the first reactant stream introduced at the first reactant stream inlet with a second reactant stream introduced at the second reactant stream inlet to produce electricity, reaction product, and heat, the system further comprising a pressurized first reactant supply having a pressure control valve for regulating the pressure of the first reactant supply, and a pressurized second reactant supply, the method comprising the steps of:

(a) interposing a vacuum ejector between the first reactant supply and the first reactant stream inlet, said ejector comprising a motive inlet, a suction inlet, and a discharge outlet;

(b) fluidly connecting said motive inlet to said first reactant supply;

(c) fluidly connecting said suction inlet to said first reactant stream outlet;

(d) fluidly connecting said discharge outlet to said first reactant stream inlet;

(e) interposing a pressure transducer between said discharge outlet and said suction inlet, said pressure transducer capable of detecting the pressure of said first reactant stream and transmitting a corresponding signal to said pressure control valve;

(f) transmitting a signal to said pressure control valve to increase the pressure of said first reactant supply when the detected pressure of said first reactant stream falls below a predetermined value; and (g) transmitting a signal to said pressure control valve to decrease the pressure of said first reactant supply when the detected pressure of said first reactant stream exceeds a predetermined value.

25. The method of claim 24 wherein said first reactant stream comprises hydrogen and said second reactant stream comprises oxygen.

26. The method of claim 24 further comprising the steps of:

(h) interposing a pressure transducer between said second reactant supply and said second reactant stream inlet, said second reactant pressure transducer capable of detecting the pressure of said second reactant stream and transmitting a corresponding signal to said pressure control valve;

(i) transmitting a signal to said pressure control valve to increase the pressure of said first reactant supply when the detected pressure of said second reactant stream increases; and (j) transmitting a signal to said pressure control valve to decrease the pressure of said first reactant supply when the detected pressure of said second reactant stream decreases.

* * * * *